United States Patent [19]

Van Staveren

[11] Patent Number: 5,064,078
[45] Date of Patent: Nov. 12, 1991

[54] COMBINATION PORTABLE HOIST, CRANE, AND VEHICLE TOWING APPARATUS

[76] Inventor: John C. Van Staveren, 12433 S. 2320 West, Riverton, Utah 84065

[21] Appl. No.: 650,402

[22] Filed: Feb. 4, 1991

Related U.S. Application Data

[63] Continuation of Ser. No. 412,455, Sep. 26, 1989, abandoned.

[51] Int. Cl.⁵ .................................................. B66C 23/44
[52] U.S. Cl. .................................... 212/180; 212/244; 212/254; 414/563
[58] Field of Search ............... 212/180, 181, 244, 254; 414/543, 563; 280/402

[56] References Cited

U.S. PATENT DOCUMENTS

| | | | |
|---|---|---|---|
| 1,400,540 | 12/1921 | Gloor | 414/563 |
| 2,804,979 | 9/1957 | Lassiter | 212/262 |
| 3,458,068 | 7/1969 | Scott | 414/563 |
| 3,599,812 | 8/1971 | Hasstedt | 414/563 |
| 3,721,356 | 3/1975 | McNeill | 280/402 |
| 3,825,132 | 7/1974 | Colangelo | 414/563 |
| 3,841,506 | 10/1974 | Smith | 414/563 |
| 3,897,879 | 8/1975 | Babik | 414/563 |
| 4,186,938 | 2/1980 | Youngblood | 414/563 |
| 4,363,591 | 12/1982 | Mackall | 212/181 |
| 4,657,468 | 4/1987 | Youmans et al. | 414/563 |
| 4,778,333 | 11/1989 | Youmans et al. | 414/563 |
| 4,881,864 | 10/1988 | Amato | 414/543 |

FOREIGN PATENT DOCUMENTS 1342281  1/1974  United Kingdom ................. 414/543

Primary Examiner—Sherman Basinger
Assistant Examiner—Thomas J. Brahan
Attorney, Agent, or Firm—J. David Nelson; Michael D. McCully

[57] ABSTRACT

A combination portable hoist, crane, and automobile towing mechanism is adaptable into three configurations. As a portable hoist, a vertical mast and hydraulically actuatable boom are mounted on a standard support having support legs oriented in a "V", with the hoist boom positioned between the support legs. As a portable crane, the mast and boom are mounted onto a platform on a modified truck bumper in a manner to pivot 360 degrees about the axis of the vertical mast. The portable crane can therefore load and remove objects to/from the truck bed. As an automobile towing mechanism, the mast and boom are locked in position within the plane of movement of the boom normal to the vehicle rear bumper. A typical automobile bumper and axle attachment towing device is attached to the boom chain. Stabilizer bars orient the bumper and axle attachment towing device parallel to and spaced from the vehicle bumper, so that the tow vehicle may elevate one end of a towed vehicle for towing in a conventional manner.

10 Claims, 2 Drawing Sheets

COMBINATION PORTABLE HOIST, CRANE, AND VEHICLE TOWING APPARATUS

This is a continuation of application Ser. No. 07/412,455, filed Sept. 26, 1989, now abandoned.

BACKGROUND OF THE INVENTION

The present invention pertains to portable hoists and cranes, and more particularly pertains to such a combination portable hoist, crane, and automobile towing mechanism that (1) includes a support for use as a conventional hoist, (2) when mounted on a modified vehicle bumper, is used as a portable crane, and (3) when mounted on a modified vehicle bumper, is used as an automobile towing mechanism.

Portable hoists are well known in the field of auto shop mechanics for use in removing, installing, and transporting automobile engines and transmissions within the workshop area. Such a portable hoist generally comprises a pair of fixed or extendable legs or feet, generally formed in the shape of a V, with a vertical shaft or mast affixed to the legs at the juncture of the V. A raisable boom is pivotally attached at or near the top of the mast in a manner that the boom may pivot to raise and lower the end of the boom. Generally a hydraulic cylinder is connected to the vertical mast and the boom to provide the force to raise and lower the boom. The end of the boom generally includes a chain or cable having a hook on the end thereof for hooking onto the object to be raised and/or moved. With numerous variations, this type portable hoist is well known and used by automobile mechanics for removing, transporting, and installing engines, transmissions, etc.

A device similar to the vertical mast and boom aspect of the portable hoist has also been used with vehicles to define a small mobile crane for loading and unloading objects and materials to and from a truck bed. In such a configuration, the vertical mast is mounted to either the truck bed or a modified truck bumper, and generally pivots about its vertical axis (the mast) in a manner to swing to and from the truck bed to load and unload objects and materials. U.S. Pat. No. 4,508,233 describes such a combination portable hoist and lifting crane mountable on a pylon plate that is permanently mounted to the bed of a truck.

SUMMARY OF THE INVENTION

The present invention takes the form of a combination portable hoist, vehicle mounted crane, and vehicle mounted auto towing mechanism. In its hoist configuration, a vertical mast is removably mounted to a "V" support similar to that previously described. A telescopically extendable boom is pivotally mounted to the top of the mast in a manner to pivot in a vertical plane generally bisecting the legs forming the "V" support. A hydraulic cylinder and piston mechanism controls the vertical movement of the boom within the plane for hoisting objects by a chain and hook connected to the end of the telescoping boom. A locking pin mechanism is provided to lock the boom in a plurality of upright positions in order to remove the force from the weight of the hoisted object from the hydraulic cylinder and piston mechanism.

In its second mode, the vehicle mounted crane, the vertical mast is attached to a vehicle rear bumper that has been modified to include a horizontal support platform for receiving the hoist or crane mast. The mast is adapted to pivot about its longitudinal axis upon the bumper support platform to enable the boom to swing a full 360 degrees in order to load and unload objects and materials from the vehicle. Additionally, the mast is lockable in at least the two positions wherein the plane of the boom movement is coincident with the longitudinal axis of the vehicle.

In its third mode, the vehicle mounted automobile towing mechanism, the mast is mounted to the vehicle modified rear bumper, as in the vehicle mounted crane, and is locked in the position wherein the boom extends rearwardly of the vehicle, essentially within the center vertical longitudinal plane of the vehicle. In this configuration, an automobile bumper and frame/axle attachment mechanism is attached to the connecter at the end of the boom chain, and a pair of stabilizer bars are pivotally attached at first ends thereof to the modified bumper, and to the bumper and frame/axle attachment mechanism at their opposite ends. In this configuration, the invention is used as an automobile towing device for attaching onto and towing disabled vehicles Other features of the invention will become apparent from the following detailed description and drawing figures that describe and illustrate what are presently contemplated as being the best modes of the invention.

DETAILED DESCRIPTION OF THE PREFERRED EMBODIMENT

Figure 1:
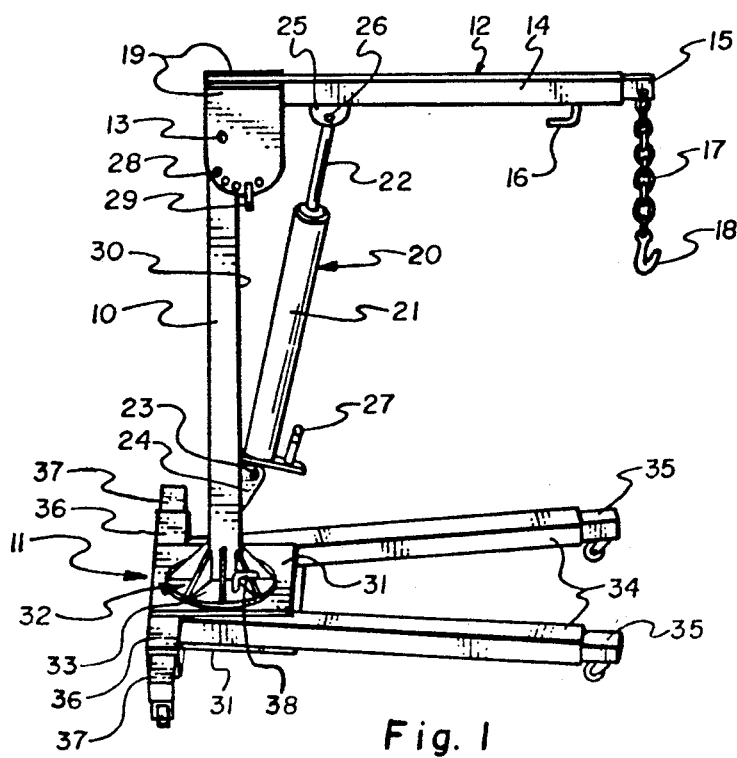
FIG. 1 is a perspective view of the present invention in its portable hoist configuration.

Turning now to the drawings, and initially to FIG. 1, the apparatus of the present invention is shown in its portable hoist configuration. A vertical mast 10 is removably mounted on a support assembly 11 in a manner to pivot about the vertical longitudinal axis of the vertical mast relative to the support assembly mounting. A boom 12 is pivotally mounted to the vertical mast 10 in a manner to pivot within a vertical plane about a rod or dowel 13 defining a pivot point.

The boom 12 is telescopically extendable, and comprises a stationary outer square tubing section 14 and an extendable inner square tubing section 15. The inner square tubing section 15 is held in position relative to the outer square tubing section 14 by one or more "L" bolts 16 that threadedly engage aligned threaded holes in the stationary outer tubing section and the extendable inner tubing section. A chain or cable 17 and hook 18 are attached to the extendable inner square tubing section 13 in a customary manner.

The stationary outer square tubing section 14 is pivotally mounted to the vertical mast 10 by the pivot rod 13 passing through aligned holes in boom mounting wings 19, and, of course, through a pivot hole (not shown) in the vertical mast 10. The pivot rod 13 may be pressed into the boom mounting wings 19 or the mast 10, or alternatively, may take the form of a shouldered bolt and nut.

The boom is actuated (raised and lowered) by the action of a hydraulic cylinder and piston mechanism 20 which comprises a hydraulic cylinder 21 and hydraulic piston 22. The hydraulic cylinder 21 is pivotally attached to the vertical mast 10 by a first pivot pin 23 extending between a pair of mast ears 24 which sandwich an "eye" (not shown) on the bottom of the hydraulic cylinder. Likewise, a pair of boom ears 25 sandwich an "eye" (not shown) formed on the end of the hydraulic piston 22 to pivotally connect the hydraulic piston to the boom at a second pivot pin 26. A manually operated handle 27 activates the hydraulic cylinder to raise the boom 14. Alternatively, the hydraulic cylinder may be actuated by a motor and hydraulic pump mechanism (not shown).

The boom mounting wings 19 include a plurality of aligned holes 28 which are adapted to receive a locking pin 29 therethrough. The locking pin 29 is adapted to rest against the surface 30 of the vertical mast 10 to lock the boom in a particular vertical position, under weight, and permit the force of the weight of a suspended object to be removed from the hydraulic cylinder and piston. In this manner, the portable hoist may be used to indefinitely suspend a heavy object, e.g., an automobile engine, without requiring that the hydraulic seals of the cylinder and piston 20 withstand the sustained loading of the weight of such heavy object. This is accomplished, of course, by (1) inserting the locking pin 29 through a pair of aligned holes 28, (2) slowly releasing the hydraulic pressure on the cylinder and piston mechanism 20 until the locking pin 29 comes to rest against the mast surface 30, and (3) further releasing any remaining cylinder and piston hydraulic pressure.

The vertical mast 10 is adapted to mount directly onto the support assembly 11, or more specifically, directly onto a mounting plate 31 of the support assembly. The mast 10 includes a mounting base 32 having a base plate 33. The base plate 33 includes a mounting shaft (not shown) which extends through aligned holes in both support mounting plates 31 in order to enable the mast to pivot relative to the support assembly 11, if desired. A flat washer and threaded locking nut (not shown) are installed on the mast base plate mounting shaft (not shown), and are tightened down against the mounting plate 31 to retain the mast in any desired position relative to the support assembly.

The support assembly 11 further includes a pair of fixed legs 34 that form essentially a "V" as shown. In this embodiment, these support assembly legs 34 include extension legs 35, telescopically extendable therefrom. The support assembly 11 also includes a second pair of fixed legs 36 which likewise include leg extensions 37. As shown this second pair of fixed and extendable legs 36, 37 is in linear alignment, essentially normal to the first pair of fixed and extendable legs 34,35. These support assembly legs telescopically extend in a conventional manner to increase the stability of the portable hoist configuration of the present invention.

To further increase the stability of the portable hoist in this configuration, a second locking pin 38 is adapted to be inserted into aligned holes in the mast mounting base plate 33 and support mounting plate 31 to lock the mast 10 to the support assembly 11 in the position wherein the boom 12 lies in a plane that bisects that "V" defined by the first set of support assembly fixed legs 34. In this portable hoist configuration, the device of the present invention functions as conventional portable hoists of similar construction.

Figure 2:
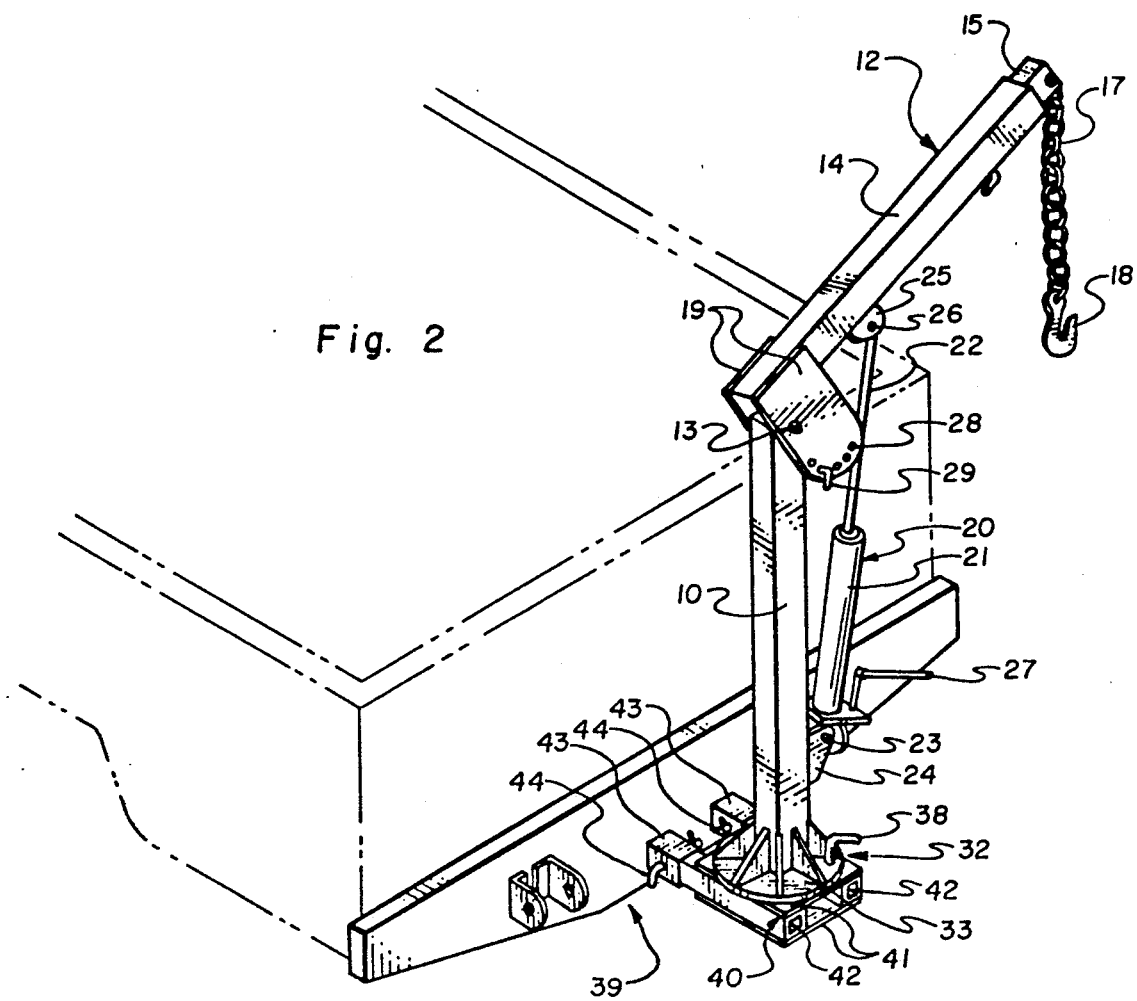
FIG. 2 is a perspective view of the present invention in its vehicle mounted crane configuration.

Turning now to FIG. 2, the device of the present invention is shown in its second operational mode, that of a vehicle mounted crane. In this mode, the mast and boom 10, 12 are removed from the support assembly 11 and pivotally mounted on a modified vehicle bumper 39. More specifically, the mast 10 is mounted at its base to a horizontal vehicle support assembly 40 which is adapted to be removably affixed to the modified vehicle bumper. The support assembly 40 is actually two similar steel plates 41 welded to two similar square tubing section sections 42 that are adapted to be inserted into mating, larger square tubing sections 43 formed with the modified vehicle bumper 39. With the vehicle support assembly 40 positioned in the modified vehicle bumper 39, third metal locking pins 44 are inserted through aligned holes in the square tubing sections 43, 42 to retain the vehicle mounting platform in functional position.

The vertical mast and boom assembly is adapted to pivot upon the vehicle support assembly 40. To this end, the flat washer and threaded nut (not shown are installed onto the threaded end of the mast mounting shaft (not shown), as in the first operational mode—the portable hoist mechanism—to retain the mast and boom in pivotal, functional position upon the modified vehicle bumper support assembly. In this configuration, however, the locking nut is not tightened down against the mounting platform lower steel plate 41, but rather, is only snugged against it sufficiently to maintain the mast and boom upright under heavy loading, yet permit the mast to pivot upon the bumper support assembly.

As can be appreciated, this vehicle mounted crane mechanism is used to load and unload heavy objects to and from the bed of the vehicle in a customary fashion. Although FIG. 2 illustrates the mast and boom assembly as being mounted along the center line axis of the vehicle, it should be obvious that the mast and boom assembly can be mounted adjacent either side of the vehicle by modifying the vehicle bumper 39 accordingly to receive the vehicle support assembly 40 at either end of the bumper.

Figure 3:
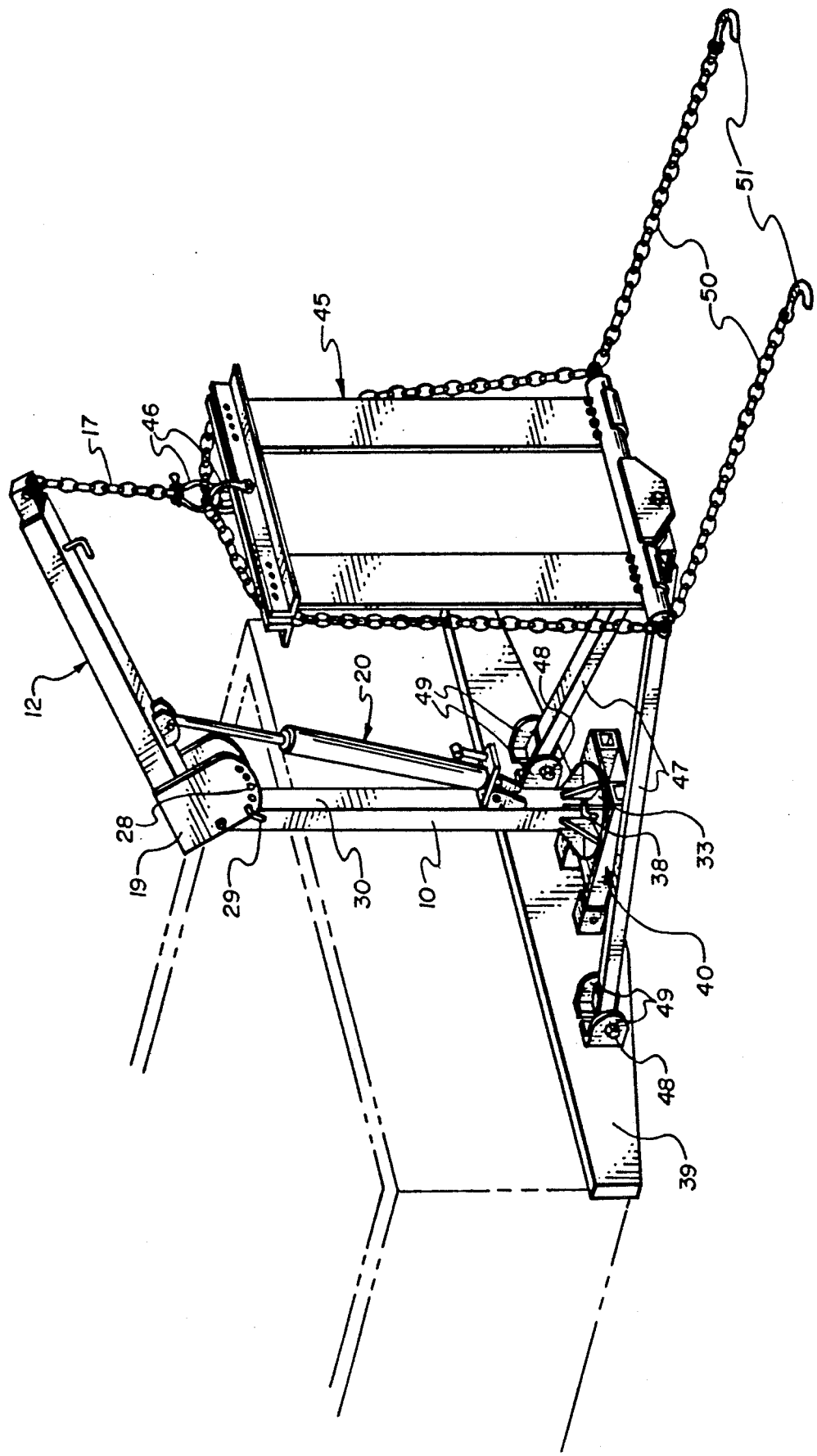
FIG. 3 is a perspective view of the present invention in its vehicle mounted automobile towing mechanism configuration.

FIG. 3 illustrates the third operational mode of the device of the present invention, a vehicle mounted automobile towing mechanism. In this third operational mode, the mast and boom assembly 10, 12 is positioned as shown in FIG. 2 along the center line axis of the vehicle, and with the boom oriented to pivot within a vertical plane coincident with the center line axis of the vehicle. With the mast and boom so positioned, the second locking pin 38 is inserted through the mast base plate 33 and vehicle bumper support assembly 40 to lock the mast in such orientation.

In this third operational configuration, a conventional bumper and frame/axle attachment device (a towing mechanism) 45 is connected to the boom chain/cable 17 by a pair of cleavaces 46 that are hooked together and oriented 90 degrees apart in order to help maintain the towing mechanism in proper orientation relative to the tow vehicle. This towing mechanism configuration includes a pair of stabilizer bars 47 that are pivotally attached to the towing mechanism 45 at first ends thereof and to the modified bumper 39 at their opposite ends. As shown, each of the stabilizer bar 47 pivotally attaches to the modified bumper 39 by a pivot pin or bolt 48 that passes through aligned holes in pairs of mounting ears 49 which are formed as part of the modified bumper.

In this third operational mode, that of an automobile towing device, the towing mechanism 45 is connected to a disabled vehicle (generally to the rear axle) in a conventional manner by a set of chains 50 and axle hooks 51. The manually actuated hydraulic cylinder and piston mechanism 20 is then actuated to raise the boom 12 to lift the attached end of the disabled vehicle off the ground for transporting to an automobile mechanic garage.

In order to remove the force of the weight of the disabled vehicle from the hydraulic piston and cylinder 20, once the end of the disabled vehicle is sufficiently high off the ground, the operator inserts the locking pin 29 the appropriate aligned holes 28 in the boom mounting wings 19 and releases the hydraulic pressure on the cylinder and piston. The force of the weight of the disabled vehicle is then transferred to the locking pin which engages the surface 30 of the mast 10 which is better suited to receive and sustain the force of the weight for extended periods of time. In this manner, the hydraulic seals of the cylinder and piston mechanism 20 are not subjected to sustained increased fluid pressure unnecessarily. Understandably, to lower the towed vehicle, the operator initially removes the pressure force from the locking pin by actuating the hydraulic cylinder to slightly raise the end of the boom. With the pressure off the locking pin, the locking pin may be removed, and the hydraulic pressure released to lower the disabled vehicle and detach the towing mechanism.

What is claimed is:

1. A combination portable hoist, vehicle mounted crane and vehicle mounted automobile towing mechanism, comprising:
   (a) a support assembly (40);
   (b) a fixed length vertical mast removably mountable upon said support assembly and rotatable about the longitudinal axis of said vertical mast;
   (c) a boom pivotally attached to said vertical mast in a manner to pivot in a vertical plane about a horizontal pivot axis, said boom including a chain or cable and hook mounted to the free end thereof;
   (d) a modified vehicle bumper (39) mountable to a conventional vehicle;
   (e) a towing mechanism (45) for attaching onto and lifting one end of a motor vehicle, said towing mechanism being removably mountable onto, and totally supported by, said modified vehicle bumper and said boom; and
   (f) power telescoping extension means for pivoting said boom about said horizontal pivot axis of said vertical mast, said extension means being pivotally mounted to said vertical mast at one end thereof and to said boom at the other end thereof wherein said support assembly comprises a support platform which is supported from said modified vehicle bumper by at least two legs.

2. The combination as set forth in claim 1, wherein said vertical mast is pivotally mountable to said support assembly (40) and said modified vehicle bumper (39) in a manner to pivot in a vertical axis essentially coincident with the geometric center axis of said vertical mast, relative to said support assembly and/or said modified vehicle bumper.

3. The combination as set forth in claim 2, wherein said mast is lockable in each of a plurality of positions about said vertical axis relative to said support assembly and/or said modified vehicle bumper assembly.

4. The combination as set forth in claim 2, wherein said towing mechanism (45) comprises:
   (a) a bumper and frame/axle attachment device attachable to said boom chain for attaching onto a vehicle to be towed, and
   (b) a pair of stabilizer bars pivotally attached at each end thereof to said frame/axle attachment device and to said modified vehicle bumper.

5. The combination as set forth in claim 1, wherein said boom is telescopically extendable.

6. The combination as set forth in claim 1, wherein said boom is lockable in each of a plurality of positions within said vertical plane relative to said vertical mast.

7. The combination as set forth in claim 1, wherein said power telescoping extension means comprises a hydraulic cylinder and piston mechanism.

8. The combination as set forth in claim 7, wherein said hydraulic cylinder and piston mechanism is manually actuatable.

9. The combination as set forth in claim 1, wherein said bumper mounting platform (40) is removably attachable to said bumper section.

10. The combination as set forth in claim 9 wherein said vertical mast upon removal from said support assembly is mountable on a second support assembly having telescopically extendable legs.

* * * * *